US012741859B2

(12) United States Patent
Gaunt et al.

(10) Patent No.: US 12,741,859 B2
(45) Date of Patent: Sep. 22, 2026

(54) REFRIGERATOR DISPENSER CONTROL INCLUDING INTEGRATED DISPENSE LEVEL INPUT SENSOR

(71) Applicant: Midea Group Co., Ltd., Foshan (CN)

(72) Inventors: Michael Gaunt, Louisville, KY (US); Gregory Butorin, Louisville, KY (US); Eric L. Scalf, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 195 days.

(21) Appl. No.: 18/621,729

(22) Filed: Mar. 29, 2024

(65) Prior Publication Data

US 2025/0304424 A1 Oct. 2, 2025

(51) Int. Cl.
*B67D 1/12* (2006.01)
*B67D 1/08* (2006.01)
*F25D 23/12* (2006.01)

(52) U.S. Cl.
CPC ......... *B67D 1/1238* (2013.01); *B67D 1/0888* (2013.01); *F25D 23/126* (2013.01); *F25D 2400/361* (2013.01)

(58) Field of Classification Search
CPC ... B67D 1/1238; B67D 1/0888; F25D 23/126; F25D 2400/361; F25C 5/22
See application file for complete search history.

(56) References Cited

U.S. PATENT DOCUMENTS 7,201,005 B2 4/2007 Voglewede
7,673,661 B2 3/2010 Chase
8,151,596 B2 4/2012 Richmond
8,245,735 B2 8/2012 Chase
8,364,321 B2 * 1/2013 Kollep ................ A47J 31/4457 426/433
8,714,210 B2 5/2014 Ashrafzadeh
9,663,343 B2 5/2017 Veldhi
9,908,768 B2 3/2018 Ashrafzadeh
10,203,786 B1 * 2/2019 Hsu .................... G06Q 30/0633
10,793,415 B2 10/2020 Choi
11,339,047 B2 5/2022 Chernov
(Continued)

FOREIGN PATENT DOCUMENTS

KR 100755142 B1 9/2007

OTHER PUBLICATIONS

Whirlpool Corporation, How to Calibrate the Measured Fill Feature, Retrieved from: https://producthelp.whirlpool.com/Refrigeration/Full-Size_Refrigerators/Product_Info/Tips_and_Tricks/How_to_Calibrate_the_Measured_Fill_Feature; 2 pages, dated Oct. 16, 2023.
(Continued)

*Primary Examiner* — Donnell A Long
(74) *Attorney, Agent, or Firm* — Gray Ice Higdon

(57) ABSTRACT

A refrigerator dispenser may include a dispenser control that includes an integrated dispense level input sensor through which a user can indicate a desired dispense level for an automatic dispense operation performed with the refrigerator dispenser. With such a dispenser control, a user may, for example, direct user input to the dispense level input sensor to select a selected position along a substantially vertical direction, such that an automatic dispense operation may dispense a controlled level of dispense product corresponding to the selected position into a container.

20 Claims, 5 Drawing Sheets

(56) References Cited

U.S. PATENT DOCUMENTS

| | | | | |
|---|---|---|---|---|
| 11,511,984 | B2 | 11/2022 | Moskowitz | |
| 12,351,448 | B2 * | 7/2025 | Moskowitz | G01F 23/22 |
| 2008/0156008 | A1 | 7/2008 | Richmond | |
| 2011/0061766 | A1 * | 3/2011 | Beier | F25C 5/22<br>141/192 |
| 2016/0370108 | A1 * | 12/2016 | Kim | F25D 23/126 |

OTHER PUBLICATIONS

GE Appliances, Refrigerator—Hands-Free Autofill Feature & Operation, Retrieved from https://products.geappliances.com/appliance/gea-support-search-content?contentId=18145, 3 pages, retrieved on: Oct. 16, 2023.

* cited by examiner

REFRIGERATOR DISPENSER CONTROL INCLUDING INTEGRATED DISPENSE LEVEL INPUT SENSOR

BACKGROUND

Residential refrigerators generally include both fresh food compartments and freezer compartments, with the former maintained at a temperature above freezing to store fresh foods and liquids, and the latter maintained at a temperature below freezing for longer-term storage of frozen foods. Various refrigerator designs have been used, including, for example, top mount refrigerators, which include a freezer compartment near the top of the refrigerator, either accessible via a separate external door from the external door for the fresh food compartment, or accessible via an internal door within the fresh food compartment; side-by-side refrigerators, which orient the freezer and fresh food compartments next to one another and extending generally along most of the height of the refrigerator; and bottom mount refrigerators, which orient the freezer compartment below the fresh food compartment and including sliding and/or hinged doors to provide access to the freezer and fresh food compartments.

Irrespective of the refrigerator design employed, many refrigerator designs also include an externally-accessible dispenser that is disposed at a convenient height on the front of the refrigerator, most often on the surface of one of the doors that provide access to one of the refrigerator compartments. Many dispensers are configured to dispense cooled water along with either cubed or crushed ice, although other dispensers may support dispensing other dispense products, e.g., hot water, sparkling water, coffee, etc.

With many dispenser designs, one or more container-actuated dispenser controls, often referred to as paddles, are used to control dispensing. A common container-actuated paddle design extends downwardly from a mounting point disposed at a top end of the paddle and proximate the dispenser opening, and rotates about a horizontal axis such that a consumer can place a cup, glass or other container underneath the dispenser opening and use the cup or glass itself to push the paddle rearwardly to activate the dispenser. In some instances, water and ice are dispensed from separate dispenser openings that are oriented side-by-side using separate paddles that are positioned below the respective openings so that a consumer can select between water and ice dispensing simply by placing the container under the appropriate opening and engaging the associated paddle. In other instances, however, the water and ice dispenser openings are oriented proximate to one another such that a single paddle may be used to dispense water or ice depending upon a particular mode selected by a user.

While many refrigerator-mounted dispensers perform manual dispense operations that are activated and deactivated through user interaction with the paddle, other dispensers support automatic dispense operations where a controlled amount of a dispense product is dispensed. In some instances, the controlled amount may be predetermined, e.g., where a user desires to dispense a fixed amount such as 16 oz of water. In other instances, a sensor may be used to sense the height of a container as well as the level of the dispense product as it is being dispensed, such that the dispense operation can be deactivated once the current level of the dispense product is a predetermined distance from the top of the container.

However, it may not necessarily be the case that a user wishes to completely fill a container with water or another dispense product. Accordingly, a need continues to exist in the art for a manner of enabling a user to simply and easily control the amount of dispense product that is dispensed into a container.

SUMMARY

The herein-described embodiments address these and other problems associated with the art by utilizing a dispenser control for a refrigerator dispenser that includes an integrated dispense level input sensor through which a user can indicate a desired dispense level for an automatic dispense operation performed with the refrigerator dispenser. With such a dispenser control, a user may, for example, direct user input to the dispense level input sensor to select a selected position along a substantially vertical direction, such that an automatic dispense operation may dispense a controlled level of dispense product corresponding to the selected position into a container.

Therefore, consistent with one aspect of the invention, a refrigerator may include a cabinet including one or more food compartments and one or more doors closing the one or more food compartments, a dispenser mounted to the cabinet to dispense a dispense product through a dispenser outlet positioned over a dispenser recess, a dispenser control positioned below the dispenser outlet and along a rear wall of the dispenser recess, the dispenser control including a dispense level input sensor extending in a substantially vertical direction along at least a portion of the dispenser control, and control logic coupled to the dispenser and the dispenser control and configured to perform an automatic dispense operation by receiving user input directed to the dispense level input sensor that selects a selected position along the substantially vertical direction and controlling the dispenser to dispense a controlled level of dispense product corresponding to the selected position into a container disposed below the dispenser outlet.

In some embodiments, the dispenser is a water dispenser and the dispense product is water. Also, in some embodiments, the dispenser control is disposed in front of the rear wall of the dispenser recess and is rotatable about a substantially horizontal axis. Further, in some embodiments, the dispenser control is mounted to the rear wall of the dispenser recess. In some embodiments, the control logic is further configured to perform a manual dispense operation by receiving user input directed to the dispenser control and controlling the dispenser to dispense the dispense product in response to the user input.

In addition, in some embodiments, the dispense level input sensor includes a resistive touch sensor that varies in resistance along the substantially vertical direction of the dispense level input sensor. In some embodiments, the dispense level input sensor includes an array of capacitive touch sensors arranged along the substantially vertical direction of the dispense level input sensor. In addition, in some embodiments, the dispense level input sensor includes a touchscreen display. In addition, some embodiments may further include a display extending along the substantially vertical direction and coupled to the control logic, and the control logic may further be configured to control the display to indicate at least one of the controlled level of dispense product corresponding to the selected position and a current level of dispense product in the container.

In some embodiments, the display includes a touchscreen display. Moreover, in some embodiments, the display includes an array of indicators extending along the substantially vertical direction. In some embodiments, the control logic is configured to indicate the controlled level of dispense product by illuminating at least one indicator in the array of indicators in a first color, and to indicate the current level of dispense product by illuminating at least one indicator in the array of indicators in a second color. In addition, in some embodiments, the display is disposed on the dispenser control adjacent to the dispense level input sensor. In some embodiments, the display is disposed on the dispenser control in an overlapping relationship with the dispense level input sensor. Moreover, in some embodiments, the display is disposed on the rear wall of the dispenser recess adjacent the dispenser control.

Also, in some embodiments, the control logic is configured to determine the controlled level of dispense product corresponding to the selected position by adding a predetermined offset to a selected level disposed substantially at the selected position. Some embodiments may also include a dispense level sensor configured to sense a current level of dispense product in the container, and the control logic may be configured to determine that the controlled level of dispense product has been dispensed into the container using the dispense level sensor. In addition, in some embodiments, the dispense level sensor includes a downwardly-facing ultrasonic sensor disposed in the dispenser recess above the dispenser control.

Also, in some embodiments, the control logic is further configured to detect an overflow condition during the automatic dispense operation in response to the sensed current level of dispense product meeting an overflow criterion, and to automatically terminate the automatic dispense operation in response to detecting the overflow condition. Moreover, in some embodiments, the user input directed to the dispense level input sensor that selects the selected position along the substantially vertical direction includes touching a lip of the container at the selected position of the dispense level input sensor.

Other embodiments may include various methods for making and/or using any of the aforementioned constructions.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
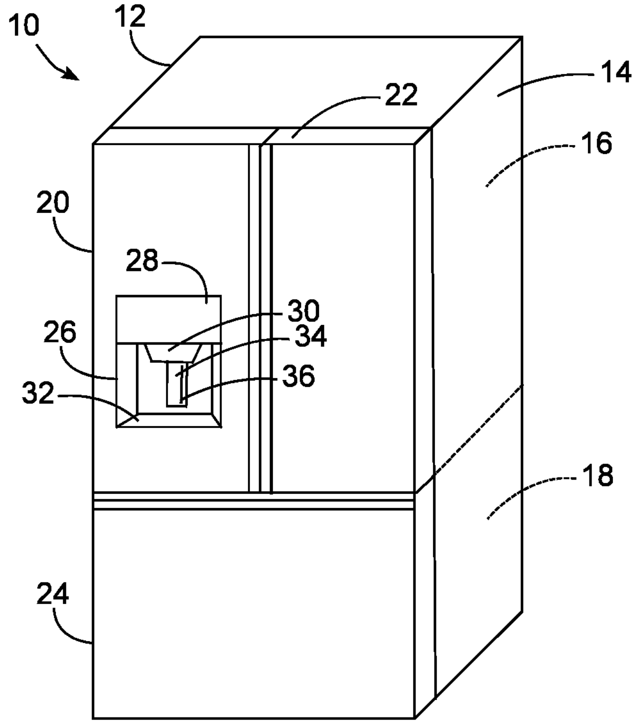
FIG. 1 is a perspective view of a refrigerator consistent with some embodiments of the invention.

Turning now to the drawings, wherein like numbers denote like parts throughout the several views, FIG. 1 illustrates an example refrigerator 10 in which the various technologies and techniques described herein may be implemented. Refrigerator 10 is a residential-type refrigerator, and as such includes a cabinet 12 including a main case 14 housing one or more food storage compartments (e.g., a fresh food compartment 16 and a freezer compartment 18), as well as one or more fresh food compartment doors 20, 22 and one or more freezer compartment doors 24 disposed adjacent respective openings of food storage compartments 16, 18 and configured to insulate the respective food storage compartments 16, 18 from an exterior environment when the doors are closed.

Fresh food compartment 16 is generally maintained at a temperature above freezing for storing fresh food such as produce, drinks, eggs, condiments, lunchmeat, cheese, etc. Various shelves, drawers, and/or sub-compartments may be provided within fresh food compartment 16 for organizing foods, and it will be appreciated that some refrigerator designs may incorporate multiple fresh food compartments and/or zones that are maintained at different temperatures and/or at different humidity levels to optimize environmental conditions for different types of foods. Freezer compartment 18 is generally maintained at a temperature below freezing for longer-term storage of frozen foods, and may also include various shelves, drawers, and/or sub-compartments for organizing foods therein.

Refrigerator 10 as illustrated in FIG. 1 is a type of bottom mount refrigerator commonly referred to as a French door refrigerator, and includes a pair of side-by-side fresh food compartment doors 20, 22 that are hinged along the left and right sides of the refrigerator to provide a wide opening for accessing the fresh food compartment, as well as a single sliding freezer compartment door 24 that is similar to a drawer and that pulls out to provide access to items in the freezer compartment. It will be appreciated, however, that other door designs may be used in other embodiments, including various combinations and numbers of hinged and/or sliding doors for each of the fresh food and freezer compartments. Moreover, while refrigerator 10 is a bottom mount refrigerator with freezer compartment 18 disposed below fresh food compartment 16, the invention is not so limited, and as such, the principles and techniques may be used in connection with other types of refrigerators in other embodiments.

Refrigerator 10 also includes a door-mounted dispenser 26 for dispensing one or more dispense products, e.g., ice and/or a fluid such as water. In the illustrated embodiments, dispenser 26 is an ice and water dispenser capable of dispensing both ice (cubed and/or crushed) and chilled water, while in other embodiments, dispenser 26 may be an ice only dispenser for dispensing only cubed and/or crushed ice, or a water only dispenser for dispensing only water. In still other embodiments, dispenser 26 may dispense hot water, coffee, beverages, or other dispense products, and may have variable and/or fast dispense capabilities, as well as an ability to dispense predetermined or measured quantities of fluids. In some instances, ice and water may be dispensed from the same location, while in other instances separate locations may be provided in the dispenser for dispensing ice and water.

Refrigerator 10 also includes a control panel 28, which in the illustrated embodiment is integrated with dispenser 26 on door 20, and which includes various input/output controls such as buttons, indicator lights, alphanumeric displays, dot matrix displays, touch-sensitive displays, etc. for interacting with a user. In other embodiments, control panel 28 may be separate from dispenser 26 (e.g., on a different door), and in other embodiments, multiple control panels may be provided. Further, in some embodiments audio feedback may be provided to a user via one or more speakers, and in some embodiments, user input may be received via a spoken or gesture-based interface. Additional user controls may also be provided elsewhere on refrigerator 10, e.g., within fresh food and/or freezer compartments 16, 18. In addition, refrigerator 10 may be controllable remotely, e.g., via a smartphone, tablet, personal digital assistant or other networked computing device, e.g., using a web interface or a dedicated app.

Furthermore, as will be discussed in greater detail below, dispenser 26 may additionally include a dispenser outlet 30 positioned over a dispenser recess 32, and a dispenser control 34, e.g., a paddle, disposed below the dispenser outlet 30 and in dispenser recess 32. As will become more apparent below, dispenser control 34 includes an integrated dispense level input sensor 36 that is capable of being used to input a desired level of dispense product to be dispensed into a container during an automatic dispense operation performed by dispenser 26.

Figure 2:
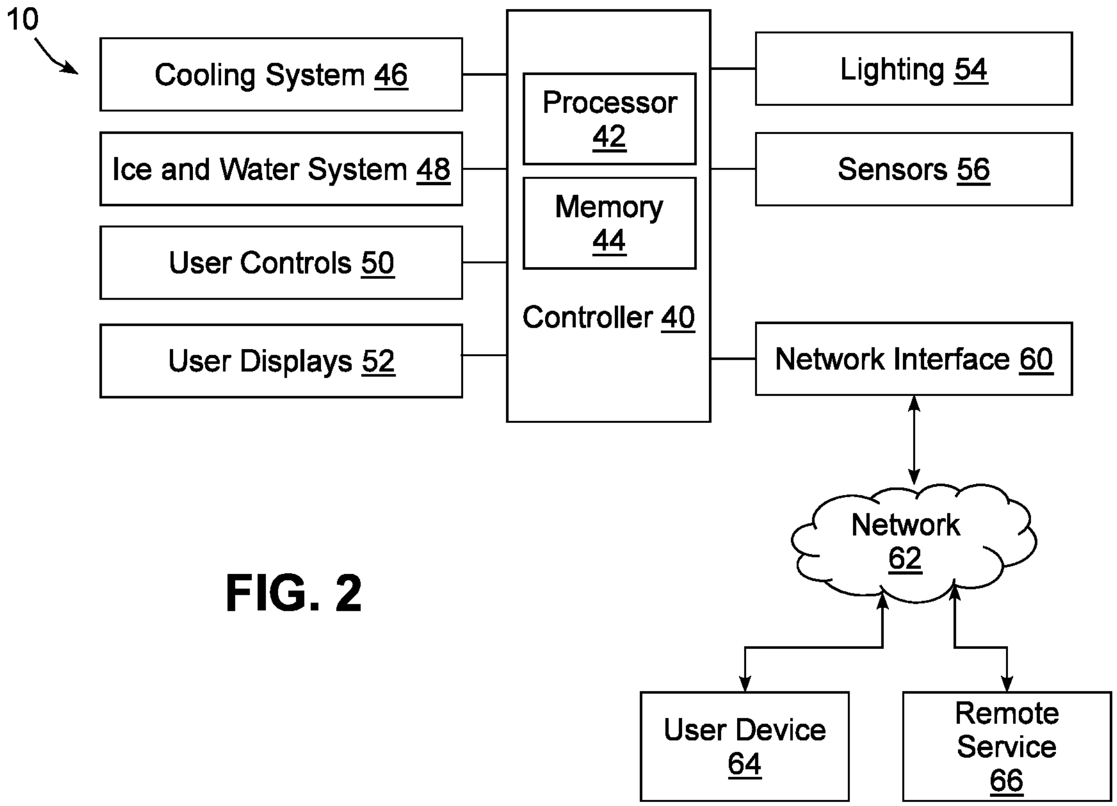
FIG. 2 is a block diagram of an example control system for the refrigerator of FIG. 1.

A refrigerator consistent with the invention also generally includes one or more controllers configured to control a refrigeration system as well as manage interaction with a user. FIG. 2, for example, illustrates an example embodiment of a refrigerator 10 including a controller 40 that receives inputs from a number of components and drives a number of components in response thereto. Controller 40 may, for example, include one or more processors 42 and a memory 44 within which may be stored program code for execution by the one or more processors. The memory may be embedded in controller 40, but may also be considered to include volatile and/or non-volatile memories, cache memories, flash memories, programmable read-only memories, read-only memories, etc., as well as memory storage physically located elsewhere from controller 40, e.g., in a mass storage device or on a remote computer interfaced with controller 40. Controller 40 may also be distributed among multiple controller circuits within refrigerator 12 in some embodiments, so the invention should not be considered to be limited to a controller implemented as a single central controller circuit as is illustrated in FIG. 2.

As shown in FIG. 2, controller 40 may be interfaced with various components, including a cooling or refrigeration system 46, an ice and water system 48 (which may be considered in some instance to include dispenser 30), one or more user controls 50 for receiving user input (e.g., various combinations of switches, knobs, buttons, sliders, touch-screens or touch-sensitive displays, microphones or audio input devices, image capture devices, etc., as well as one or more variable controls as discussed in greater detail below), and one or more user displays 52 (including various indicators, graphical displays, textual displays, speakers, etc.), as well as various additional components suitable for use in a refrigerator, e.g., interior and/or exterior lighting 54, among others. At least a portion of user controls 50 and user displays 52 may be implemented in control panel 28 in some embodiments.

Controller 40 may also be interfaced with various sensors 56 located to sense environmental conditions inside of and/or external to refrigerator 10, e.g., one or more temperature sensors, humidity sensors, dispense level sensors, etc. Such sensors may be internal or external to refrigerator 10, and may be coupled wirelessly to controller 40 in some embodiments.

In some embodiments, controller 40 may also be coupled to one or more network interfaces 60, e.g., for interfacing with external devices via wired and/or wireless networks such as Ethernet, Wi-Fi, Bluetooth, NFC, cellular and other suitable networks, collectively represented in FIG. 2 at 62. Network 62 may incorporate in some embodiments a home automation network, and various communication protocols may be supported, including various types of home automation communication protocols. In other embodiments, other wireless protocols, e.g., Wi-Fi or Bluetooth, may be used.

In some embodiments, refrigerator 10 may be interfaced with one or more user devices 64 over network 62, e.g., computers, tablets, smart phones, wearable devices, etc., and through which refrigerator 10 may be controlled and/or refrigerator 10 may provide user feedback. Refrigerator 10 may also be interfaced in some embodiments with one or more remote services 66, e.g., various cloud or remote computing services.

In some embodiments, controller 40 may operate under the control of an operating system and may execute or otherwise rely upon various computer software applications, components, programs, objects, modules, data structures, etc. In addition, controller 40 may also incorporate hardware logic to implement some or all of the functionality disclosed herein. Further, in some embodiments, the operational sequences performed by controller 40 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

Numerous variations and modifications to the refrigerator illustrated in FIGS. 1-2 will be apparent to one of ordinary skill in the art, as will become apparent from the description below. Therefore, the invention is not limited to the specific implementations discussed herein.

Refrigerator Dispenser Control Including Integrated Dispense Level Input Sensor

Embodiments consistent with the invention utilize a dispenser control that includes a dispense level input sensor disposed thereon to enable a user to control the amount of a dispense product dispensed into a container during an automatic dispense operation performed with the dispenser. A dispenser control, in this regard, may be considered to be a control utilized to activate and/or deactivate a refrigerator dispenser, particularly for manual dispense operations where the refrigerator dispenser is activated and deactivated based on the state of the dispenser control. In some embodiments, and in particular, embodiments incorporating external door-mounted dispensers, a dispenser control is generally disposed underneath a dispenser outlet, and within a dispenser recess formed in the external surface of a refrigerator door. In some embodiments, a dispenser control may be referred to as a paddle, and may be mounted for rotation about a substantially horizontal axis, and may extend downwardly in front of a rear wall of the dispenser recess, such that the dispenser control is actuated by pressing against the dispenser control to rotate the dispenser control rearwardly. Alternatively, a paddle-type dispenser control may be mounted to a rear wall of the dispenser recess and may be actuated by pressing on the surface of the dispenser control. While in some embodiments a dispenser control may be actuated using one's fingers or hands, in many embodiments a dispenser control is intended to be container-actuated, such that the beverage container to be filled is pressed against the dispenser control to activate the dispenser.

It will be appreciated, however, that other types of dispenser controls may be used in other embodiments, and may be disposed in the interior of a refrigerator in some embodiments, so the invention is not limited to the specific embodiments disclosed herein. In addition, the discussion hereinafter will focus on a water dispenser where the dispense product is cooled water, or alternatively, an ice and water dispenser where one of the dispense products is cooled water. It will be appreciated, however, that the invention may be used in connection with dispensing other dispense products and/or combinations of dispense products, e.g., ice, coffee, hot water, etc., so the invention is not limited to use with water dispensers.

Figure 3:
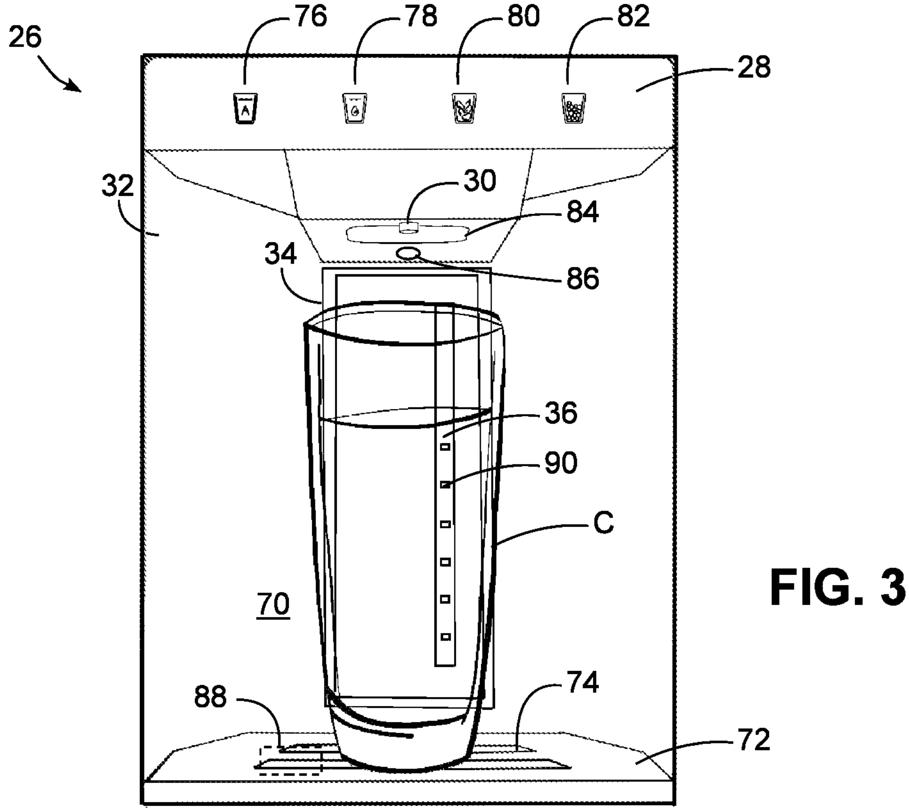
FIG. 3 is a front elevational of an example embodiment of the refrigerator dispenser of FIGS. 1-2.

FIG. 3, for example, illustrates dispenser 26 in greater detail. As mentioned above, dispenser includes a dispenser control 34 implemented as a container-actuated paddle, and including an integrated dispense level input sensor 36 disposed thereon. Dispense level input sensor 36 extends in a substantially vertical direction along at least a portion of dispenser control 34, and as will become more apparent below, user input, e.g., selection of a position along the substantially vertical direction using one's fingers or hands, or alternatively, using the lip of a beverage container C, may be used to control the dispenser to dispense a controlled level of water corresponding to the selected position into the container.

Recess 32 of dispenser 26 as illustrated includes a rear wall 70 and a platform 72 for supporting beverage container C. A sump 74 may also be provided for capturing spillage generated during a dispense operation. Control panel 28 in the illustrated embodiment includes a set of control buttons 76, 78, 80, 82 for performing various dispense operations, or alternatively selecting different modes of operation for the dispenser. Button 76 is used to perform an automatic water dispense operation or alternatively select an automatic water dispense mode, while button 78 is used to perform a manual water dispense operation or alternatively select a manual water dispense mode. Buttons 80 and 82 perform similar functions for cubed ice and crushed ice, respectively. In some embodiments, for example, buttons 76-82 may be used to select different modes, with dispenser control 34 used to activate and deactivate the dispenser to perform a dispense operation corresponding to the currently selected mode. For automatic water dispense operations, however, it may be desirable to utilize button 76 to also activate the automatic water dispense operation after a dispense level has been selected using dispense level input sensor 36, with deactivation of the operation occurring based upon the sensed level of water in the container.

Dispenser 26 includes, in addition to a water outlet 30, an ice outlet 84, both of which are positioned in dispenser recess 32 and above dispenser control 34 and container C. Furthermore, a dispense level sensor 86, e.g., a downwardly-facing ultrasonic distance sensor, is positioned in dispenser recess 32 and above dispenser control 34 and container C. Dispense level sensor 86 may be used to sense a current level of water in container C, and may be used to determine when the controlled level of water selected using dispense level input sensor 36 has been dispensed into the container. It will be appreciated that the level or amount of water in container C may be determined in other manners and using other sensors in other embodiments. For example, in some embodiments, a weight sensor 88, integrated into platform 72, may be used to determine the amount of water dispensed into container C. Other suitable sensors will be appreciated by those of ordinary skill having the benefit of the instant disclosure.

In addition, in the illustrated embodiment, a display 90 is also integrated into dispenser control 34 to provide feedback to a user, e.g., as to the controlled or selected level of water to be dispensed and/or to the current level of water dispensed into container C. In the embodiment of FIG. 3, dispense level input sensor 36 and display 90 are implemented using a touchscreen display, such that both the user input to select a position and associated dispense level, and the display of feedback to the user, are implemented in the same touch-sensitive display.

Figure 4:
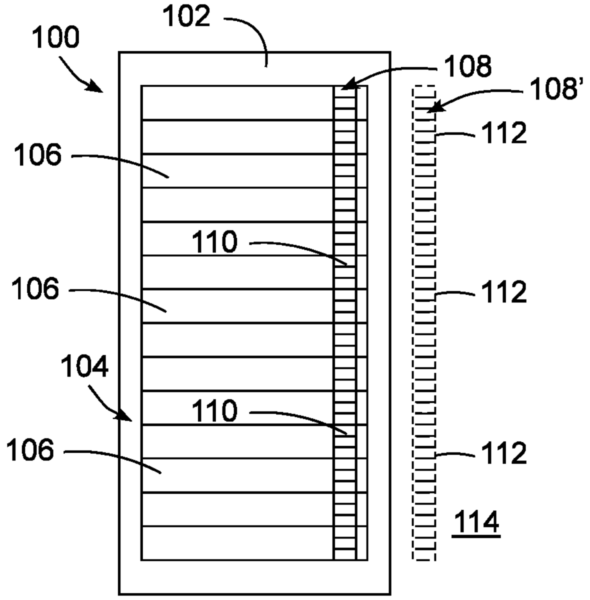
FIG. 4 is a front elevational view of another embodiment of a dispenser control to that illustrated in FIG. 3.

In other embodiments, however, other types of sensors and/or displays may be used. FIG. 4, for example, illustrates a dispenser control 100 that includes a front face 102 upon which is disposed a dispense level input sensor 104 implemented using an array of capacitive touch sensors 106, as well as a display 108 implemented using an array of indicators (e.g., LED's) 110. In this embodiment, display 108 is disposed on dispenser control 100 in an overlapping relationship with dispense level input sensor 104; however, in other embodiments (e.g., as discussed below in connection with FIG. 6), display 108 may be disposed adjacent to dispense level input sensor 104 on dispenser control 100. In addition, as illustrated at 108', in other embodiments a display may not be disposed on a dispenser control, but may be disposed in other areas, e.g., using an array of indicators 112 disposed on a dispenser recess rear wall 114.

Figure 5:
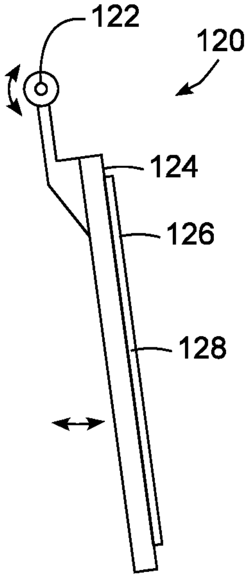
FIG. 5 is a side elevational view of yet another embodiment of a dispenser control to that illustrated in FIG. 3.

In addition, as illustrated by dispenser control 120 of FIG. 5, rather than being mounted to the rear wall of a dispenser recess, a dispenser control may include a hinge 122 configured to rotate about a substantially horizontal axis. A front face 124 of dispenser control 120 also includes a dispense level input sensor 126 and display 128.

As noted above, dispense level input sensor 104 of FIG. 4 is implemented using an array of capacitive touch sensors 106. However, other types of sensors may be used in other embodiments. Dispense level input sensor 126 of FIG. 5, for example, may be implemented using a resistive touch sensor that varies in resistance along the substantially vertical direction of the dispense level input sensor. A wide variety of other sensor implementations capable of receiving user input of a desired dispense level along a substantially vertical direction may be used in other embodiments, e.g., an array of discrete push buttons. As another alternative, a slide potentiometer may be used, such that a control that slides up and down with an indicator that indicates an approximate desired fluid level. A rotary potentiometer may also be used in some embodiments, whereby the desired fluid level could be indicated via rotary motion of a control. Yet another embodiment may utilize a level detection sensor to detect the vertical location of a user's hand as they reach to interact with a display, with an additional sensor such as a capacitive touch pad used to detect the moment when the user touches the dispenser control, such that the desired fluid level is based on the sensed vertical location when the user touches the dispenser control. In addition, in some embodiments, a dispense level input sensor may also be used to control manual dispense operations, e.g., where the dispenser control is mounted to the rear wall of the dispenser recess, such that the output of the dispense level input sensor may be used to sense actuation of the dispenser control.

Figure 6:
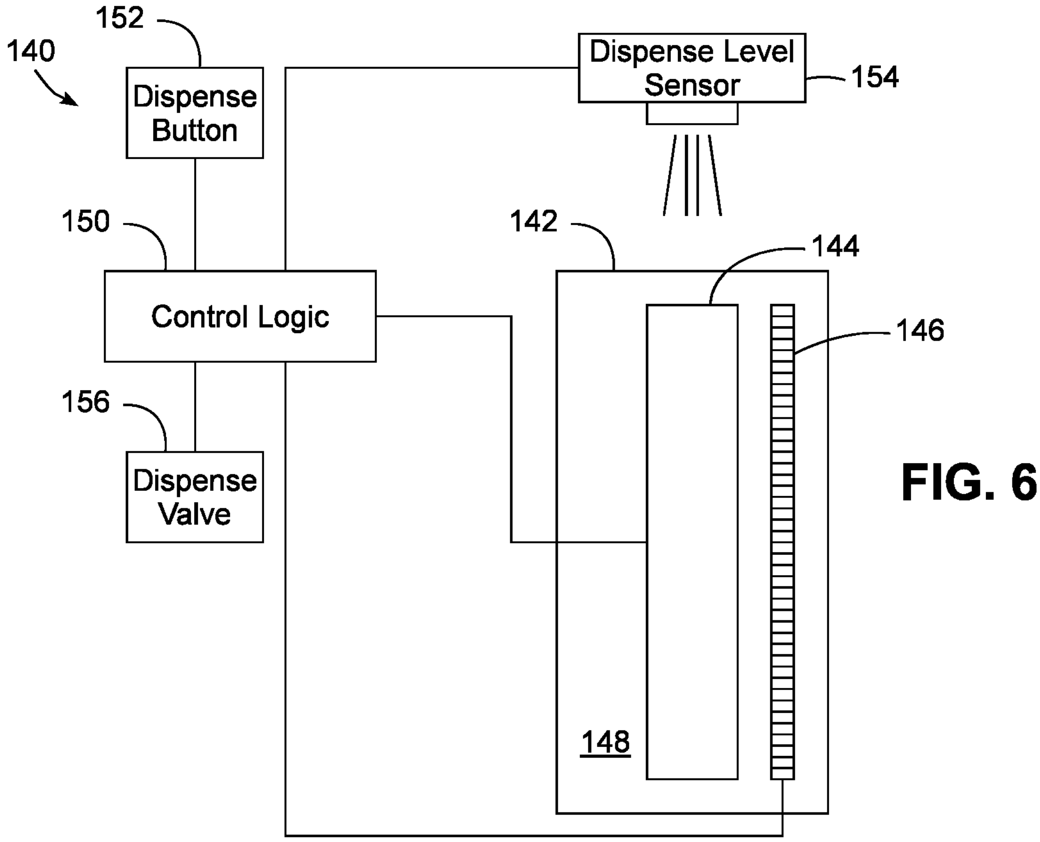
FIG. 6 is a functional block diagram of a refrigerator dispenser consistent with some embodiments of the invention.

FIG. 6 next illustrates a refrigerator dispenser 140 consistent with some embodiments of the invention, and including a dispenser control 142 with a dispense level input sensor 144 and display 146 disposed adjacent one another on a front face 148 of the dispenser control. In this embodiment, dispense level input sensor 144 is implemented using a resistive touch sensor, while display 146 is implemented using an array of multi-color LEDs.

Control logic 150, which in some embodiments may be a controller such as controller 40 of FIG. 2, may also be implemented using a separate controller, or using discrete and/or non-programmable circuit components. In addition to receiving input from dispense level input sensor 144, control logic 150 also receives input from a dispense button 152 (e.g., button 76 of FIG. 3, or any other user control suitable for initiating an automatic dispense operation) and a dispense level sensor 154 (e.g., a downwardly-facing ultrasonic distance sensor). Further, in addition to controlling display 146, control logic 150 also controls a dispense valve 156 (e.g., a solenoid-driven valve) to selectively activate or deactivate the dispensing of water by refrigerator dispenser 140.

Figure 7:
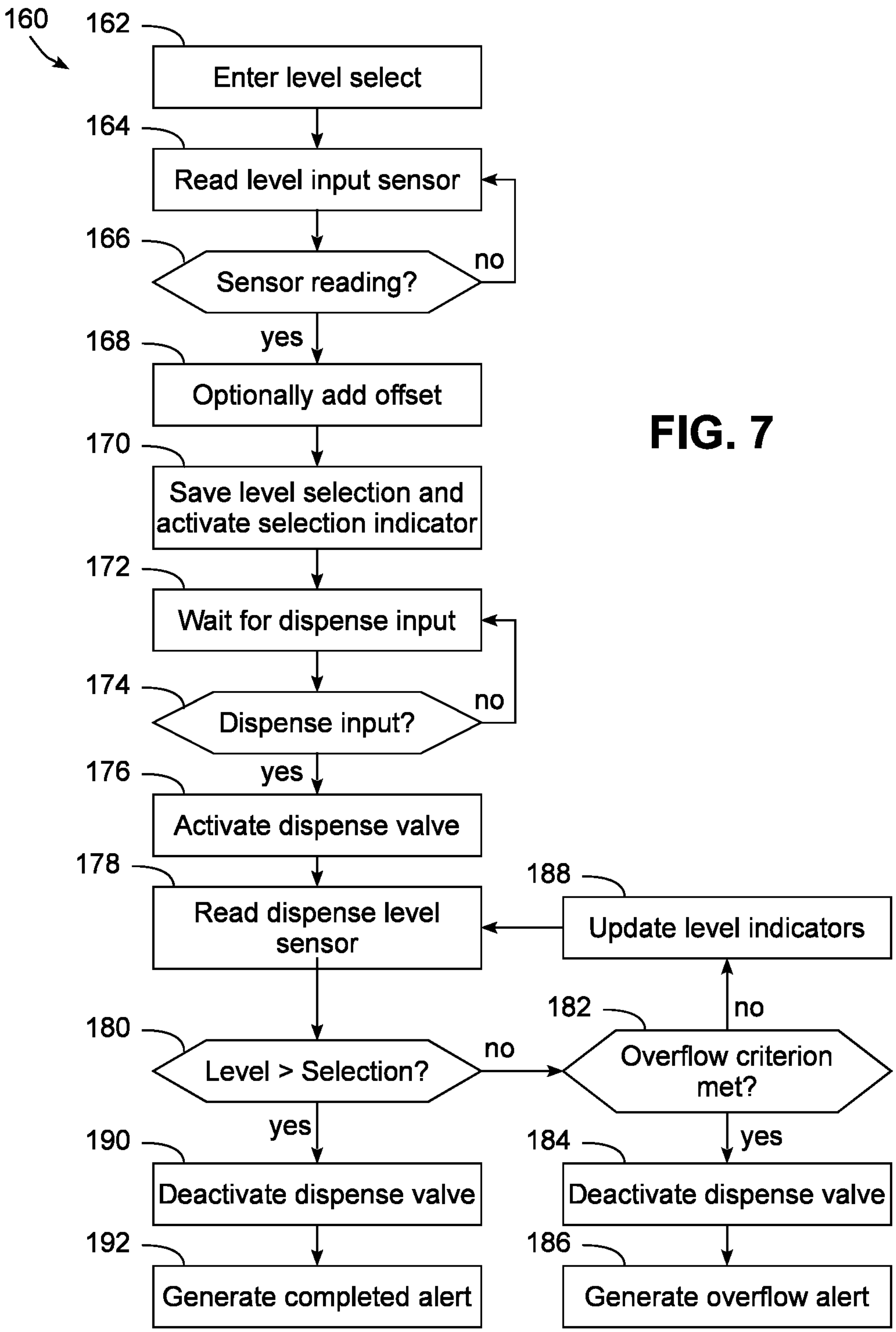
FIG. 7 is a flowchart illustrating an example operational sequence for performing an automatic dispense operation using the refrigerator dispenser of FIG. 6.

FIG. 7 illustrates an example operational sequence 160 for performing an automatic dispense operation using refrigerator dispenser 140. Operational sequence 160 begins in block 162 by entering a level select mode. The level select mode may be initiated, for example, by depressing a button such as button 76 of FIG. 3, by touching dispense level input sensor 144, or in other suitable manners. In some embodiments, block 162 may be omitted.

Next, in blocks 164 and 166, dispense level input sensor 144 is monitored to wait for user input selecting a position along the vertical direction of the sensor. It will be appreciated that the selected position may be mapped to a selected level of water to be dispensed into a container. Once a position is selected, block 166 passes control to block 168 to optionally add an offset to the selected level and thereby generate a controlled level of water to be dispensed to the container. It may be desirable, for example, to lower the level of water to be dispensed from the selected level to reduce the risk of spillage and/or overfilling. In other embodiments, however, no offset may be added, such that the selected level is substantially equal to the controlled level to be dispensed, and block 168 may be omitted.

Next, in block 170, the level selection is saved, thereby setting the controlled level of water to be dispensed into the container. In addition, a selection indicator on display 146 may be activated, thereby indicating the controlled level of water to be dispensed into the container. The selection indicator, for example, may be indicated by activating one or more LEDs in display 146 proximate the level of water that will be dispensed into the container. Next, blocks 172 and 174 wait for a dispense input from the user, which will initiate the automatic dispense operation. The dispense input, for example, may be selection of a button by a user (e.g., button 76 of FIG. 3), or other suitable user input, including, for example, speech, gesture, mobile device input, etc. In other embodiments, initiation of the automatic dispense operation may be based on detecting the presence of the container in the proper location, e.g., via dispense level sensor 154, via a weight sensor such as sensor 88 of FIG. 3, via a side-mounted presence sensor, or in other suitable manners that will be appreciated by those of ordinary skill having the benefit of the instant disclosure. In another embodiment, the dispense input may be initiated via the dispenser control itself, e.g., whereby the dispenser control is locked or otherwise disabled during level selection and then unlocked or reactivated after the level selection has been made to allow the user to push their container against the dispenser control to initiate the dispense step, optionally using a short delay between the input and dispense start to allow the user to set down their container and get their hand out of the way. As yet another alternative, the initiation of dispense may be time based, rather than requiring an additional input.

Once the dispense input is received, block 174 passes control to block 176 to activate the dispense valve and initiate the automatic dispense operation. Block 178 then initiates a loop to monitor the current level of water dispensed into the container using dispense level sensor 154. Block 180 determines if the current level meets a completion criterion, e.g., the current level exceeding the level selection saved in block 170, or another suitable criterion.

If not, control passes to block 182 to determine if an overflow criterion has been met. It will be appreciated, for example, that if the level of water in the container does not rise while dispensing, it is likely that the container is completely full and the dispensed water is spilling over the lip of the container and into the sump of the dispenser recess. As such, in some embodiments, an overflow criterion may be met when the sensed current level does not change (or has a rate of change below a predetermined threshold) for a predetermined duration (e.g., about 7 seconds in some embodiments). The duration may be selected, for example, in order to balance the desire to accommodate wide containers such as pots (which will generally have slower level changes) and slower flow rates (which may be caused by low supply pressure) with the desire to limit the amount of spillage that occurs before shutting off. As another alternative, in some embodiments, an additional overflow sensor, e.g., a conductivity, capacitive or other suitable water/moisture sensor may be disposed in the sump to detect if sufficient fluid has entered the sump.

Thus, if the overflow criterion is met, block 182 passes control to block 184 to deactivate the dispenser valve to discontinue the flow of water into the container. In addition, control may also pass to block 186 to generate an overflow alert, e.g., using audio (e.g., a beep), an indication on display 146 (e.g., flashing one or more indicators in a predetermined color), a message on a control panel, a notification on a mobile device, etc. The automatic dispense operation is then complete.

Returning to block 182, if the overflow criterion is not met, control passes to block 188 to update the level indicators in display 146, e.g., to display a current level of the water in the container. Control then returns to block 178 to continue to monitor the dispense level sensor.

Returning to block 180, if the completion criterion is met, control passes to block 190 to deactivate the dispenser valve to discontinue the flow of water into the container. In addition, control may also pass to block 192 to generate a completed alert, e.g., using audio (e.g., a beep), an indication on display 146 (e.g., flashing one or more indicators in a predetermined color), a message on a control panel, a notification on a mobile device, etc. The automatic dispense operation is then complete.

Figure 8:
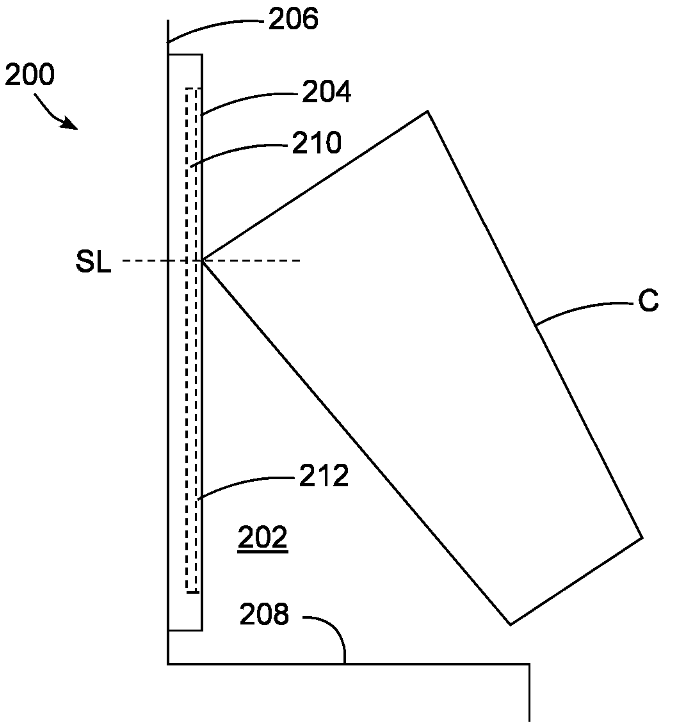
FIGS. 8-10 illustrate an example automatic dispense operation performed using the operational sequence of FIG. 7.
Figure 9:
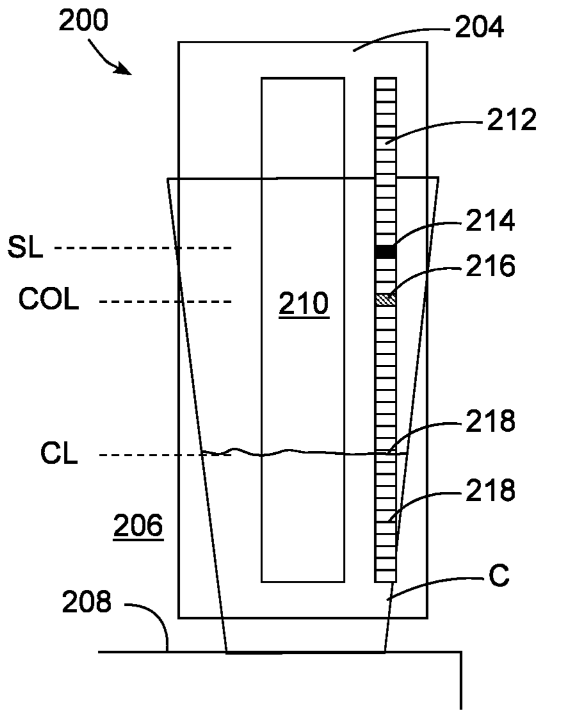
Figure 10:
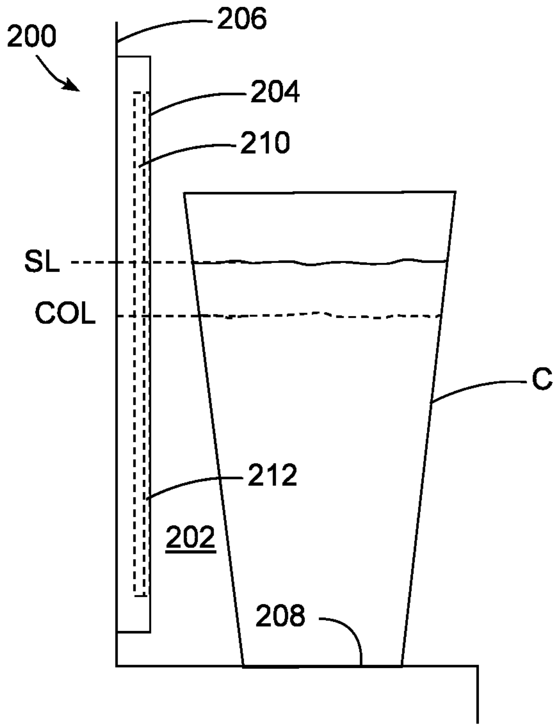

Now turning to FIGS. 8-10, an example automatic dispense operation, e.g., as performed by operational sequence 160 of FIG. 7, is illustrated in further detail. FIG. 8, for example, illustrates an example refrigerator dispenser 200 including a dispenser recess 202 in which is disposed a dispenser control 204 mounted on a rear wall 206 of the dispenser recess and above a platform 208 configured to support a container C during the automatic dispense operation. A dispense level input sensor 210 and a display 212 are disposed on dispenser control 204. Display 212 is implemented using a vertical array of multi-color (e.g., two color) LEDs.

FIG. 8 in particular illustrates user input directed to dispense level input sensor 210 that selects a selected position along the substantially vertical direction, which takes the form of touching a lip of container C at the selected position of the dispense level input sensor (e.g., as determined in blocks 164-166 of FIG. 7). From this selected position, a selected level (SL) for dispensing is determined, and optionally an offset is added to the selected level to generate a controlled level (COL), as discussed above in connection with blocks 168-170 of FIG. 7. In addition, as illustrated in FIG. 9, the controlled level may be indicated by illuminating one or more LEDs of display 212. Where no offset is added, for example, the controlled level may be substantially the same as the selected level, and as such, one or more LEDs (e.g., LED 214) may be illuminated at the selected level (SL). Where an offset is added, the controlled level includes the offset, and one or more different LEDs (e.g., LED 216) may be illuminated at the offset-adjusted controlled level (COL).

FIG. 9 also illustrates partial completion of the automatic dispense operation (e.g., after dispense input is received and the dispense valve has been activated in blocks 172-176), where water has been dispensed to a current level (CL). During the loop defined by blocks 178-182 and 188, water is dispensed to container C, and block 188 updates display 212 by illuminating one or more LEDs (e.g., LEDs 218). In some embodiments, for example, all LEDs at or below the current level may be illuminated, while in other embodiments, only one or more LEDs proximate to the current level may be illuminated. In addition, while single color LEDs may be used in some embodiments, in the embodiment of FIGS. 8-10, multi-color LEDs are used, with a first color (e.g., blue) used for the LEDs 214, 216 that indicate the selected or controlled level, and a second color (e.g., white) used for the LEDs 218 that indicate the current level.

It will therefore be appreciated that display 212 may provide a visual cue to a user that the automatic dispense operation is proceeding correctly, displaying both the intended water dispense level after selection and the current water level over time as the dispense operation is performed. The display also provides a user with visual confirmation that the dispense level sensor is reading/calibrated correctly. Auditory cues such as a begin/end chime or chimes corresponding to user presses may be included.

The automatic dispense operation continues in this manner until block 180 determines that the completion criterion has been met, which is illustrated in FIG. 10. Depending upon whether an offset is utilized in generating the controlled level, dispensing will continue until reaching the SL or COL levels illustrated in FIG. 10, whereby the automatic dispense operation is complete.

Other modifications may be made without departing from the spirit and scope of the invention. For example, a moisture sensor may be incorporated into the sump of the dispenser recess in some embodiments to detect overflowing water once it reaches a specified volume (e.g., based on the volume of the orifice in which the sensor is placed), in order to prevent unattended overfilling from flooding a user's kitchen. If the orifice fills with enough water that the sensor is submerged, the conductivity of water will short the sensor and cut power to the dispenser valve to prevent further dispensing.

In addition, in some embodiments, where fast or variable dispense rates are supported, an automatic dispense operation may be configured to initially dispense at a faster rate and then, when reaching a predetermined distance or percentage from the controlled level, drop the dispense rate to a slower rate to complete the dispense operation. By doing so, lower dispense times may be achieved while still allowing for more stable monitoring of the current level when nearing the controlled level to ensure that the amount of water initially selected by the user is actually dispensed.

It will be appreciated that, while certain features may be discussed herein in connection with certain embodiments and/or in connection with certain figures, unless expressly stated to the contrary, such features generally may be incorporated into any of the embodiments discussed and illustrated herein. Moreover, features that are disclosed as being combined in some embodiments may generally be implemented separately in other embodiments, and features that are disclosed as being implemented separately in some embodiments may be combined in other embodiments, so the fact that a particular feature is discussed in the context of one embodiment but not another should not be construed as an admission that those two embodiments are mutually exclusive of one another. Various additional modifications may be made to the illustrated embodiments consistent with the invention. Therefore, the invention lies in the claims hereinafter appended.

What is claimed is:

1. A refrigerator, comprising:

a cabinet including one or more food compartments and one or more doors closing the one or more food compartments;

a dispenser mounted to the cabinet to dispense a dispense product through a dispenser outlet positioned over a dispenser recess;

a dispenser control positioned below the dispenser outlet and along a rear wall of the dispenser recess, the dispenser control including a dispense level input sensor disposed thereon and extending in a substantially vertical direction along at least a portion of the dispenser control; and control logic coupled to the dispenser and the dispenser control and configured to perform an automatic dispense operation by receiving user input directed to the dispense level input sensor that selects a selected position along the substantially vertical direction and controlling the dispenser to dispense a controlled level of dispense product corresponding to the selected position into a container disposed below the dispenser outlet;

wherein the control logic is further configured to perform a manual dispense operation by receiving user input directed to the dispenser control and controlling the dispenser to activate and deactivate dispensing of the dispense product in response to the user input directed to the dispenser control.

2. The refrigerator of claim 1, wherein the dispenser is a water dispenser and the dispense product is water.

3. The refrigerator of claim 1, wherein the dispenser control is disposed in front of the rear wall of the dispenser recess and is rotatable about a substantially horizontal axis, and the dispense level input sensor is disposed on a front face of the dispenser control.

4. The refrigerator of claim 1, wherein the dispenser control is mounted to the rear wall of the dispenser recess, and the dispense level input sensor is disposed on a front face of the dispenser control.

5. The refrigerator of claim 1, wherein the dispense level input sensor includes a resistive touch sensor that varies in resistance along the substantially vertical direction of the dispense level input sensor.

6. The refrigerator of claim 1, wherein the dispense level input sensor includes an array of capacitive touch sensors arranged along the substantially vertical direction of the dispense level input sensor.

7. The refrigerator of claim 1, wherein the dispense level input sensor includes a touchscreen display.

8. The refrigerator of claim 1, further comprising a display extending along the substantially vertical direction and coupled to the control logic, wherein the control logic is further configured to control the display to indicate at least one of the controlled level of dispense product corresponding to the selected position and a current level of dispense product in the container.

9. The refrigerator of claim 8, wherein the display comprises a touchscreen display.

10. The refrigerator of claim 8, wherein the display comprises an array of indicators extending along the substantially vertical direction.

11. The refrigerator of claim 10, wherein the control logic is configured to indicate the controlled level of dispense product by illuminating at least one indicator in the array of indicators in a first color, and to indicate the current level of dispense product by illuminating at least one indicator in the array of indicators in a second color.

12. The refrigerator of claim 8, wherein the display is disposed on the dispenser control adjacent to the dispense level input sensor.

13. The refrigerator of claim 8, wherein the display is disposed on the dispenser control in an overlapping relationship with the dispense level input sensor.

14. The refrigerator of claim 8, wherein the display is disposed on the rear wall of the dispenser recess adjacent the dispenser control.

15. The refrigerator of claim 1, further comprising a dispense level sensor configured to sense a current level of dispense product in the container, wherein the control logic is configured to determine that the controlled level of dispense product has been dispensed into the container using the dispense level sensor.

16. The refrigerator of claim 15, wherein the dispense level sensor comprises a downwardly-facing ultrasonic sensor disposed in the dispenser recess above the dispenser control.

17. The refrigerator of claim 15, wherein the control logic is further configured to detect an overflow condition during the automatic dispense operation in response to the sensed current level of dispense product meeting an overflow criterion, and to automatically terminate the automatic dispense operation in response to detecting the overflow condition.

18. The refrigerator of claim 1, wherein the user input directed to the dispense level input sensor that selects the selected position along the substantially vertical direction comprises touching a lip of the container at the selected position of the dispense level input sensor.

19. The refrigerator of claim 1, wherein the dispenser control is positioned within the dispenser recess to orient an opening of a container to receive dispensed product when the container is pressed towards the rear surface of the dispenser recess and against the dispenser control to generate the user input directed to the dispenser control during the manual dispense operation.

20. A refrigerator, comprising:

a cabinet including one or more food compartments and one or more doors closing the one or more food compartments;

a dispenser mounted to the cabinet to dispense a dispense product through a dispenser outlet positioned over a dispenser recess;

a dispenser control positioned below the dispenser outlet and along a rear wall of the dispenser recess, the dispenser control including a dispense level input sensor extending in a substantially vertical direction along at least a portion of the dispenser control; and control logic coupled to the dispenser and the dispenser control and configured to perform an automatic dispense operation by receiving user input directed to the dispense level input sensor that selects a selected position along the substantially vertical direction and controlling the dispenser to dispense a controlled level of dispense product corresponding to the selected position into a container disposed below the dispenser outlet;

wherein the control logic is configured to determine the controlled level of dispense product corresponding to the selected position by adding a predetermined offset to a selected level disposed substantially at the selected position.

* * * * *